United States Patent [19]
Todd et al.

[11] Patent Number: 6,108,161
[45] Date of Patent: Aug. 22, 2000

[54] CARTRIDGE LOADING METHOD AND APPARATUS

[75] Inventors: Christian A. Todd, Thornton; Lester M. Yeakley, Estes Park; David T. Hoge, Westminster; Clark M. Janssen, Loveland, all of Colo.

[73] Assignee: Storage Technology Corporation, Louisville, Colo.

[21] Appl. No.: 09/387,608

[22] Filed: Aug. 31, 1999

Related U.S. Application Data

[62] Division of application No. 09/103,436, Jun. 24, 1998.
[51] Int. Cl.$^7$ .................................................. G11B 5/008
[52] U.S. Cl. .............................................................. 360/96.5
[58] Field of Search ............................... 360/93, 95, 96.5, 360/96.6

[56] References Cited

U.S. PATENT DOCUMENTS

| 4,227,224 | 10/1980 | Umezawa et al. | 360/96.5 |
|---|---|---|---|
| 4,652,949 | 3/1987 | Muraoka | 360/96.5 |
| 4,918,551 | 4/1990 | Yoshida et al. | 360/96.5 |
| 5,557,485 | 9/1996 | Stephens et al. | 360/96.5 |
| 5,706,147 | 1/1998 | Lee | 360/96.5 |

FOREIGN PATENT DOCUMENTS 56-000060  1/1981  Japan .

*Primary Examiner*—William Klimowicz
*Attorney, Agent, or Firm*—Brooks & Kushman P.C.

[57] ABSTRACT

An apparatus is provided for moving a tape cartridge with respect to a read/write head in a media system, wherein the tape cartridge includes a tape stored on tape reels. The apparatus includes a housing having a base, and a plurality of flexures extending substantially perpendicularly with respect to the base and having first and second ends. The first ends are attached to the housing. A deck is configured for holding a tape cartridge with the tape exposed at one end of the deck. The deck is attached to the second ends of the flexures. The flexures are sufficiently flexible to allow movement of the deck with respect to the base for moving the tape toward and away from the read/write head. A shuttle interlock mechanism is positioned between the deck and a movable shuttle for selectively locking the shuttle with respect to the deck to prevent damage to the read/write head. A substantially H-shaped flexure connects the deck to a vertically movable motor plate to prevent backlash.

13 Claims, 11 Drawing Sheets

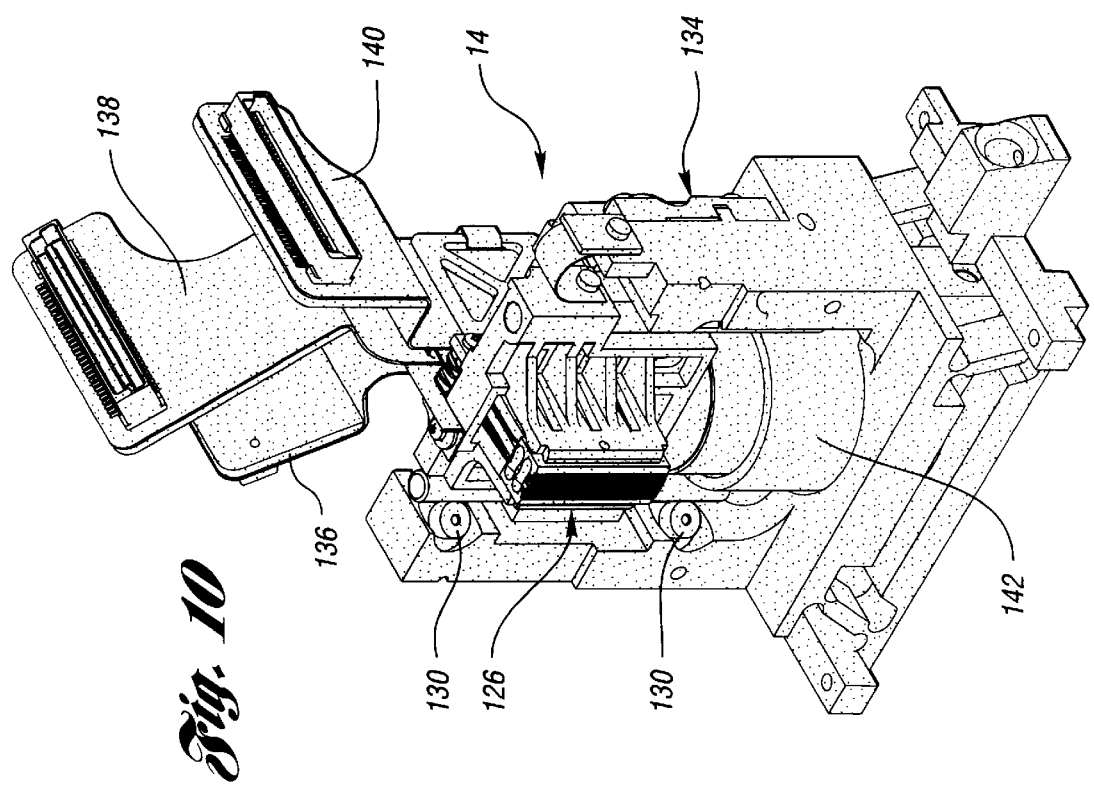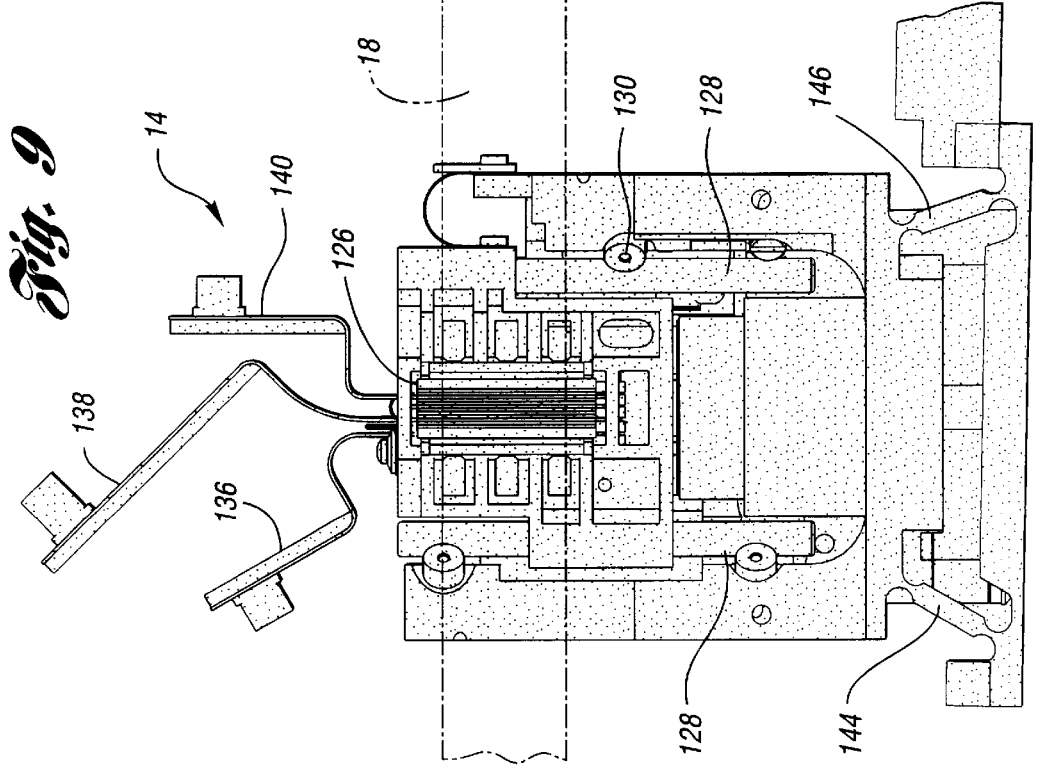

CARTRIDGE LOADING METHOD AND APPARATUS

This is a divisional of copending application Ser. No. 09/103,436 filed on Jun. 24, 1998.

TECHNICAL FIELD

The present invention relates to a cartridge loading device with a novel cartridge receiving and indexing scheme.

BACKGROUND ART

Cartridge loading devices for use in a media system can be highly complex and expensive, particularly due to the accurate repeatability required in locating the cartridge with respect to the read/write head. In particular, it is desirable that the cartridge be located within ±1 minute of skew (side-to-side of cartridge); ±0.0005 inch of tilt (front-to-rear of cartridge); ±0.6 degrees of wrap (±0.005 penetration onto read/write head); with a load time of less than 500 milliseconds.

In the prior art, the tape is usually lifted away from the read/write head by blowing air against the tape to lift it away from the head during high speed tape functions, such as rewind or fast-forward. However, the structure required for such pneumatics is typically large and heavy, and therefore expensive. Accordingly, it is desirable to provide an improved tape lifter function without pneumatics and without posing risk of damage to the tape. It is also desirable that the tape be engaged with or disengaged from the head within 70 milliseconds by a repeatable tape lifter function.

It is also desirable to provide a means for accurately engaging the reel motors which drive the cassette tape reels, without backlash. Additionally, the read/write head must be protected from robotic or manual loading impacts when the cartridge is inserted into position within the loading device.

Preferably, such functions would be provided within a load/drive unit which may be packaged in a small area, such as a 5¼ inch form factor drive.

DISCLOSURE OF INVENTION

The present invention improves upon the prior art and achieves the above-stated design criteria by providing an improved cartridge loading device with a novel cartridge registration scheme which accurately locates the cartridge while preventing loading impacts, provides an accurate and repeatable tape lifter function, and provides repeatable reel motor engagement without backlash, while minimizing product cost.

Specifically, one aspect of the invention provides an apparatus for moving a tape cartridge with respect to a read/write head in a media system, wherein the tape cartridge includes a tape stored on tape reels. The apparatus includes a housing having a base, and a plurality of flexures extending substantially perpendicularly with respect to the base and having first and second ends. The first ends are attached to the housing. A deck is configured for holding a tape cartridge with the tape exposed at one end of the deck. The deck is attached to the second ends of the flexures. The flexures are sufficiently rigid to support the deck and sufficiently flexible to allow movement of the deck with respect to the base for moving the tape toward and away from the read/write head.

Preferably, a movable shuttle is positioned within the deck for moving the tape cartridge with respect to the deck. A shuttle interlock mechanism is positioned between the deck and the shuttle for selectively locking the shuttle with respect to the deck to prevent damage to the read/write head from loading impacts when cartridges are inserted.

The tape cartridge preferably includes primary, secondary, and tertiary locating features, and the cartridge loading device includes a plurality of springs for providing a preload against each of such locating features. Also, preferably a head cleaner brush is actuated by a rotary drum with a helical cam path for cleaning the read/write head during loading and unloading of the cartridge.

Preferably, a vertically movable motor plate is positioned adjacent the deck and includes first and second reel motors mounted thereon for driving the tape reels. A substantially flat flexible flexure member is connected at opposing ends to the deck and motor plate, respectively, to allow relative vertical movement of the motor plate and deck while preventing reel motor backlash. The flexure member is preferably a substantially H-shaped steel structure.

Another aspect of the invention provides a method of engaging a tape cartridge with a read/write head in a media system. The method includes: a) receiving the tape cartridge within a movable shuttle which is locked in a position spaced from the read/write head; b) unlocking the shuttle; and c) moving the shuttle toward the read/write head to engage the tape cartridge with the read/write head. The tape cartridge includes a three-point primary datum, a two-point secondary datum, and a one-point tertiary datum, and the method further includes providing a spring load against each such datum point.

Accordingly, an object of the invention is to provide a structure and method for repeatedly locating a tape cartridge with respect to a read/write head in a media system.

Another object of the invention is to provide a tape lifter function which does not require pneumatics, and does not risk damage to the media.

A further object of the invention is to provide a means of accurately engaging the reel motors of a media system without backlash.

Still another object of the invention is to provide a cartridge loading device which protects the read/write head from robotic and manual loading impacts.

A further object of the invention is to provide a cartridge loading device which includes structure for cleaning the read/write head on each load/unload cycle.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 5a shows a cut-away perspective view of an interior rear corner of the deck of FIG. 5;

FIG. 5b shows a cut-away perspective view of an opposing interior rear corner of the deck of FIG. 5;

FIG. 9 shows a front view of the read/write head of FIG. 8 with the tape thereon;

FIG. 10 shows a perspective view of the read/write head of FIG. 7;

BEST MODE FOR CARRYING OUT THE INVENTION

Figure 5:
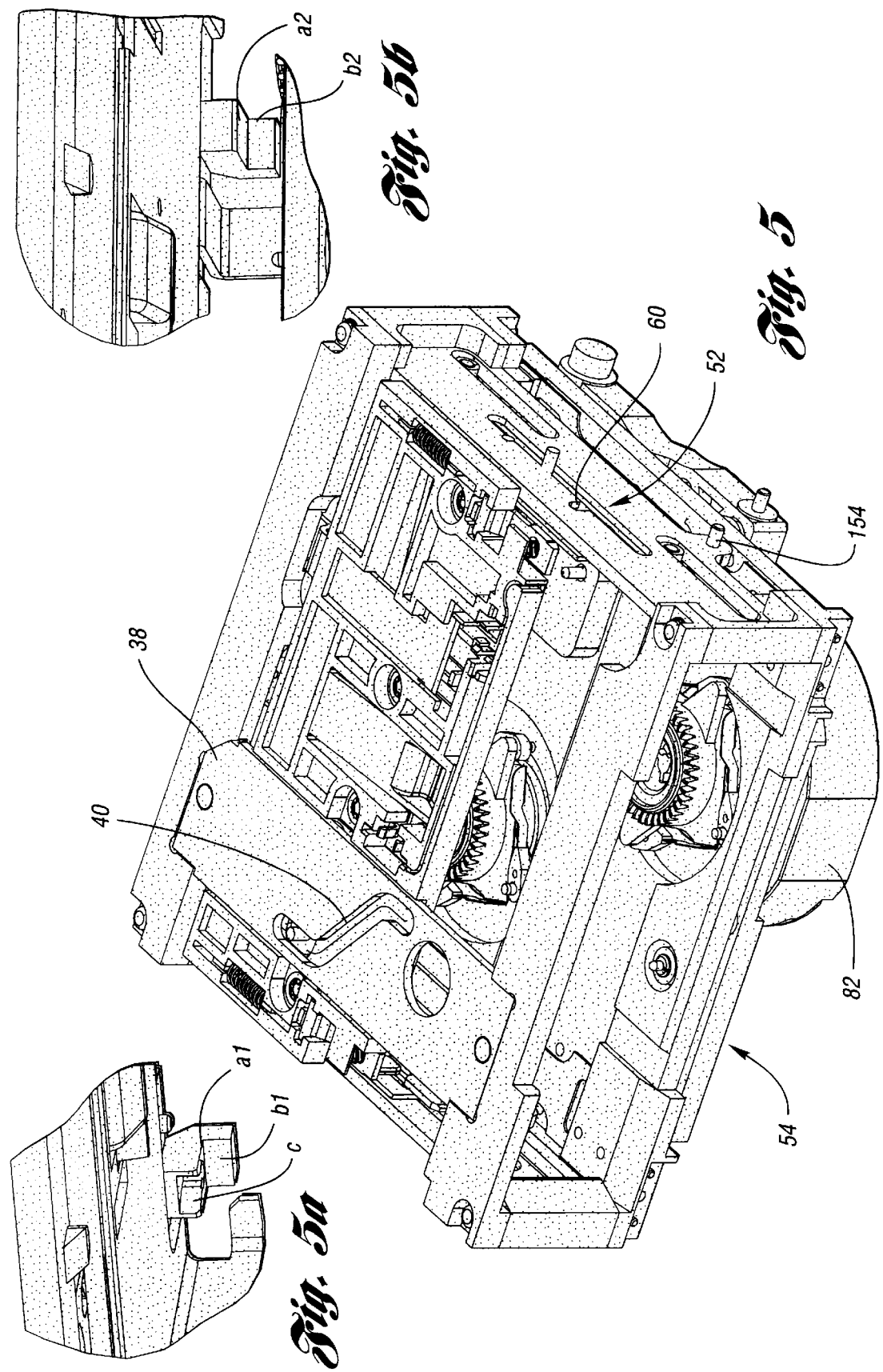
FIG. 5 shows a perspective view of a movable deck assembly in accordance with the present invention.
Figure 6:
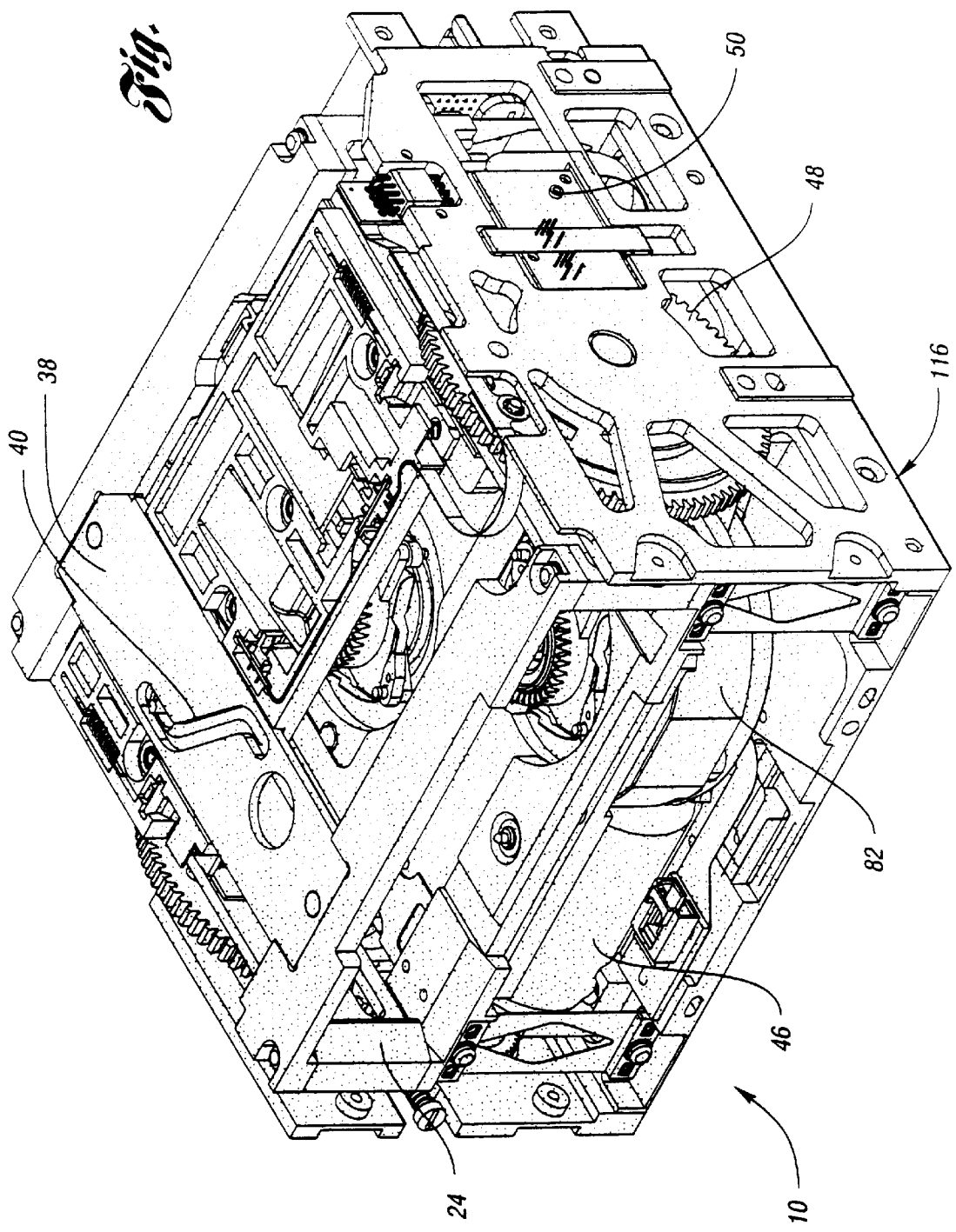
FIG. 6 shows a front perspective view of the cartridge loading device in accordance with the present invention.
Figure 7:
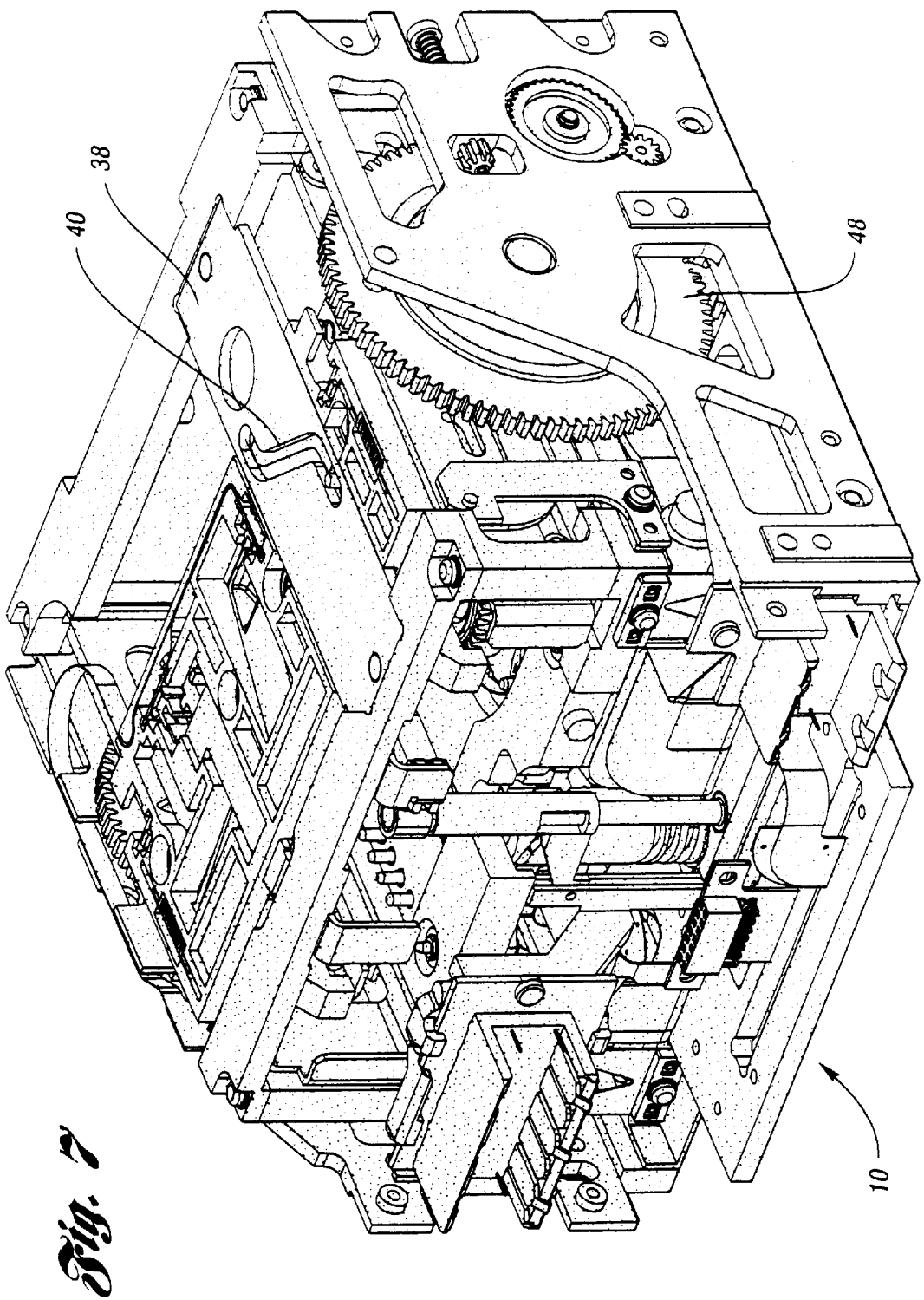
FIG. 7 shows a rear perspective view of the cartridge loading device in accordance with the invention.
Figure 8:
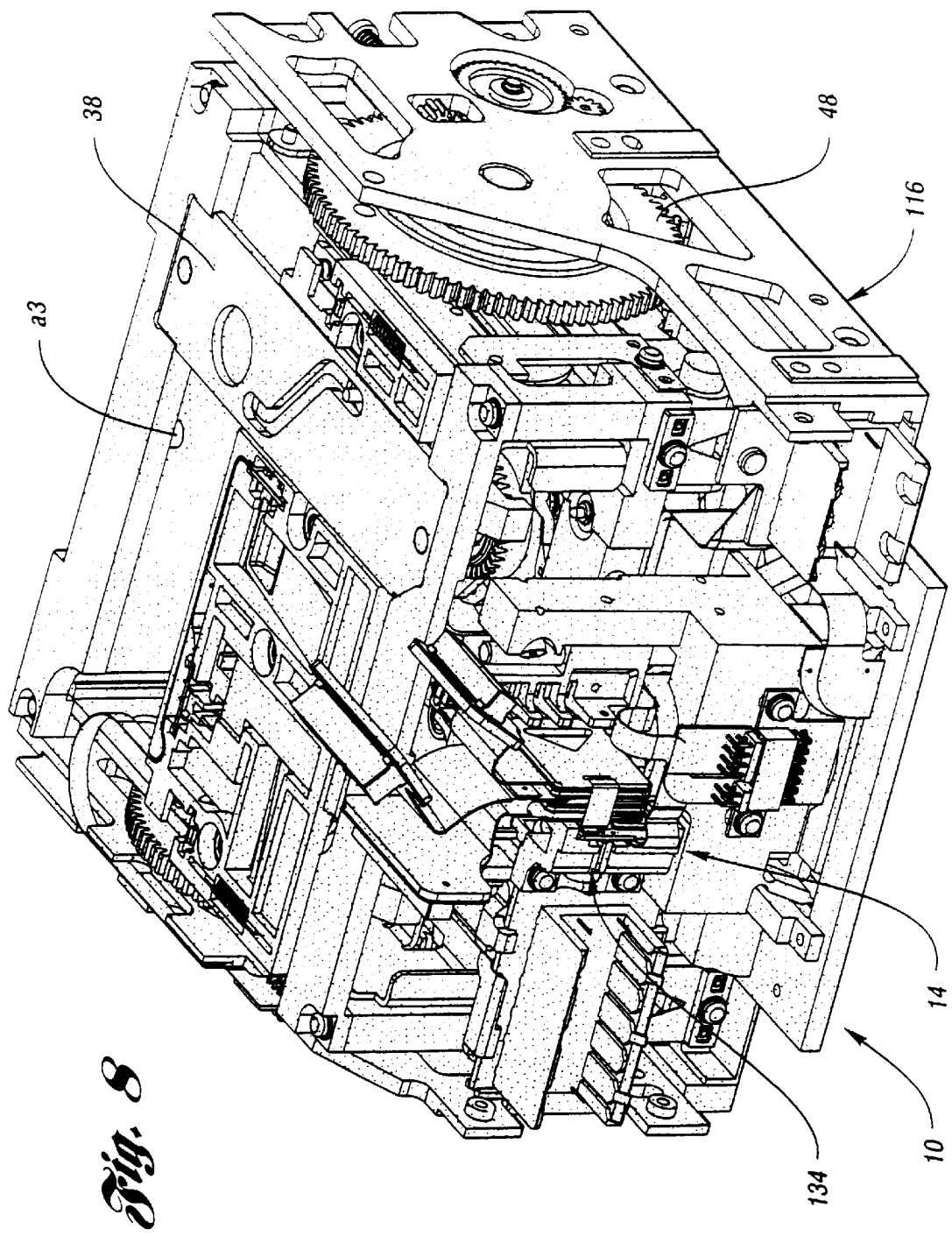
FIG. 8 shows a rear perspective view of the cartridge loading device of FIG. 7 including a read/write head.
Figure 11A:
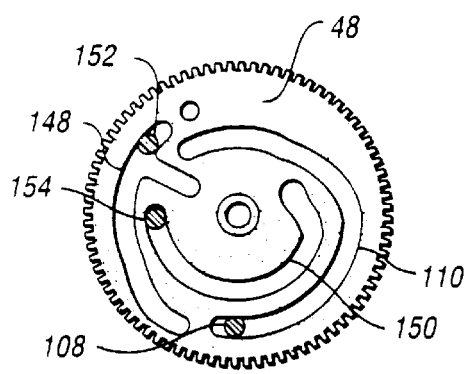
FIGURES 11a–11g show schematic plan views of the cam plate in sequentially rotated positions.
Figure 11B:
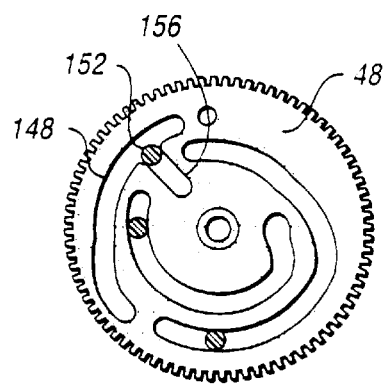
Figure 11C:
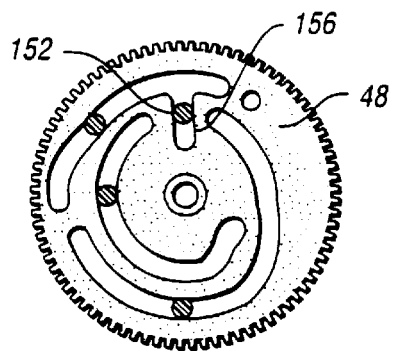
Figure 11D:
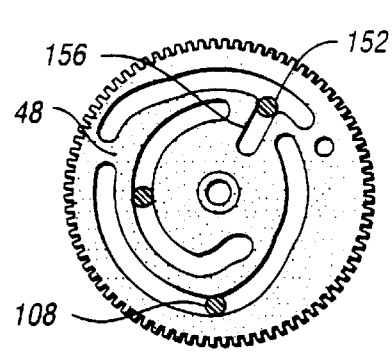
Figure 11E:
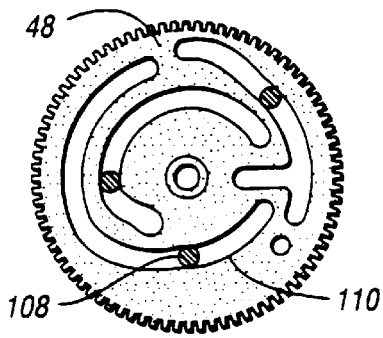
Figure 11F:
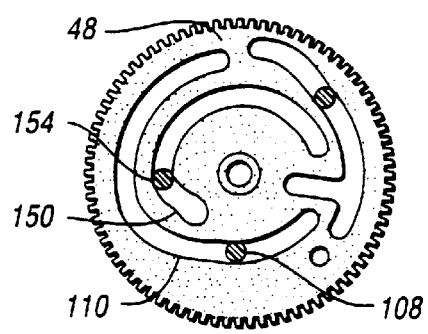
Figure 11G:
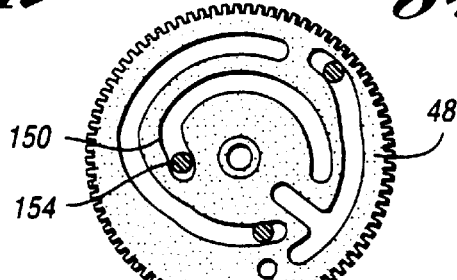
Figure 12:
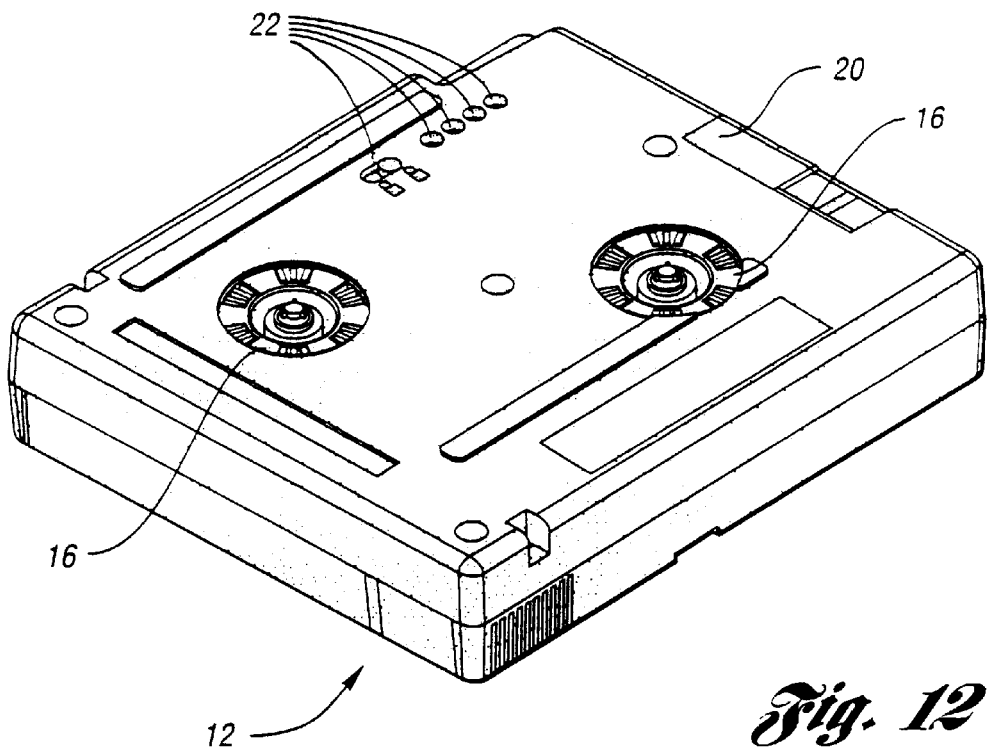
FIG. 12 shows a perspective view of a tape cartridge for use with the present invention.
Figure 13:
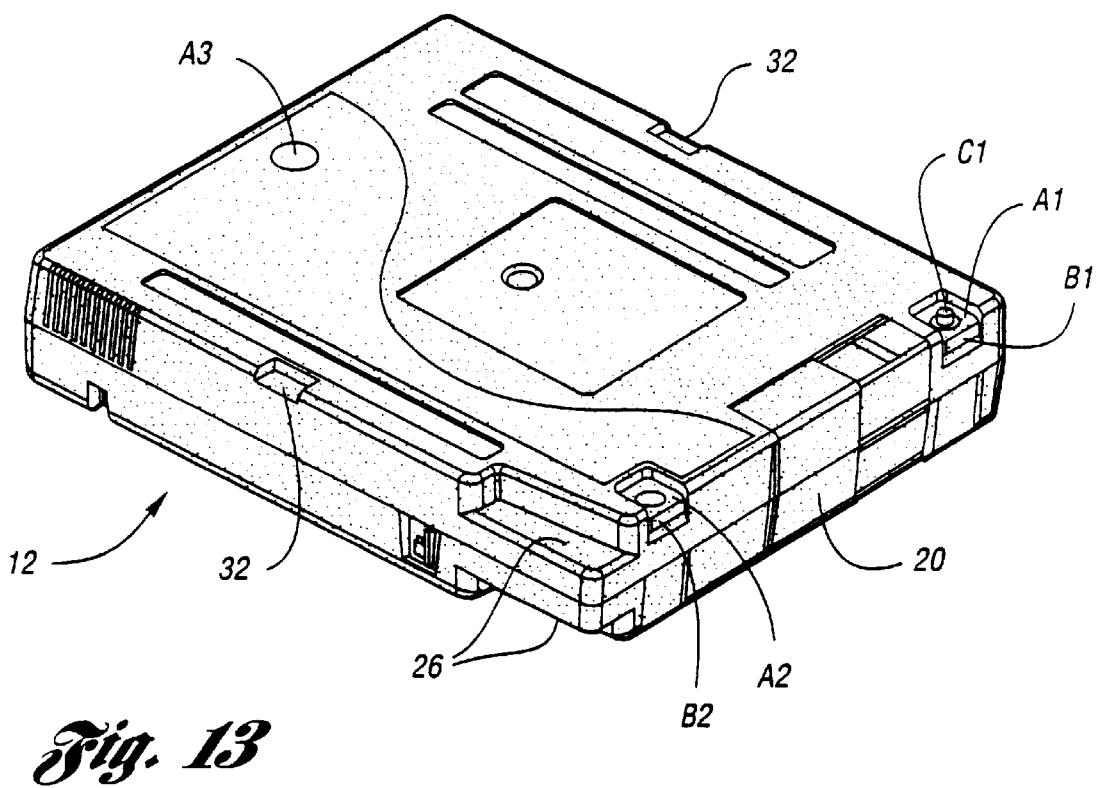
FIG. 13 shows a reverse perspective view of the tape cartridge of FIG. 12.

Referring to FIGS. 6–8, a cartridge loading device 10 is shown in accordance with the present invention for receiving a tape cartridge, such as that shown in FIGS. 12 and 13. The various components of the cartridge loading device are shown in FIGS. 1–5 and 9–11. The structure of the cartridge loading device 10 will be described in a cartridge loading sequence for loading the cartridge 12 for engagement with the read/write head assembly 14 shown in FIGS. 9 and 10 (specifically item 126 in FIG. 10).

As shown in FIGS. 12 and 13, the tape cartridge 12 includes drive reels 16 which hold a tape 18 (shown in FIG. 9) within the tape cartridge 12. The cartridge 12 includes a tape door 20 for covering the tape 18, and a plurality of cartridge ID recesses 22.

The cartridge 12 also includes primary datums A1, A2, A3; secondary datums B1, B2; and a tertiary datum C1 for properly locating the tape cartridge 12 with respect to the read/write head 126.

The first step in loading the cartridge 12 is to insert the cartridge 12 into the drive opening 24, shown in FIG. 6. The insertion of the cartridge 12 into the drive opening 24 may be performed by a robotic arm with a hand assembly for manipulating the cartridge 12, or it may be manually inserted. As the cartridge 12 is inserted, a keying feature 26 (shown in FIG. 13) is engaged to verify correct orientation of the cartridge 12.

Figure 1:
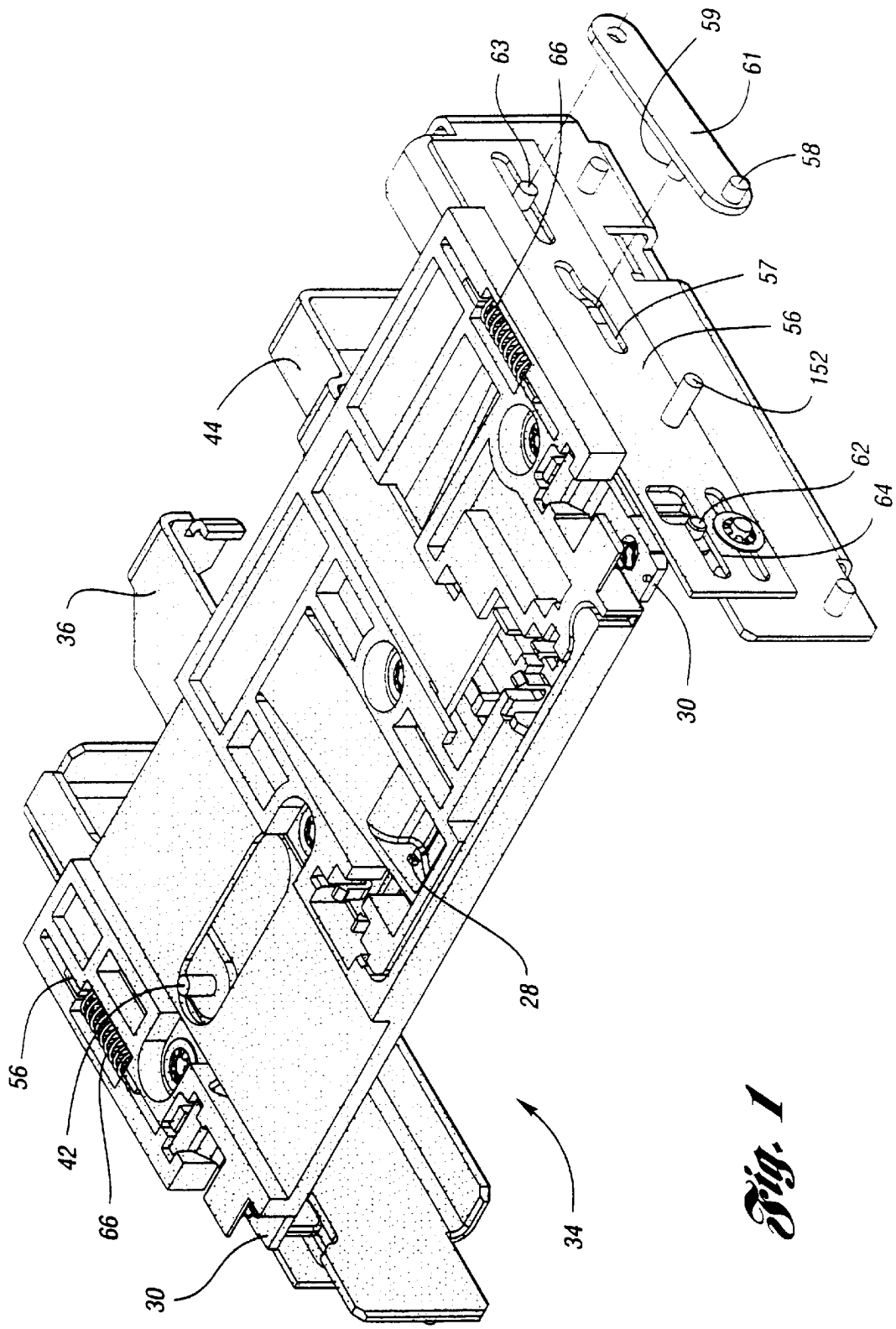
FIG. 1 shows a partially exploded perspective view of a shuttle in accordance with the present invention.

As the cartridge 12 is further inserted, a cartridge-in-slot sensor 28, shown in FIG. 1, is tripped so that the storage library system knows that a cartridge has been inserted so that the robotics do not attempt to load another cartridge. Detent arms 30, shown in FIG. 1, then engage the recesses 32 of the cartridge 12, shown in FIG. 13, so that the cartridge 12 is grasped by the shuttle assembly 34, shown in FIG. 1, for manipulating the cartridge 12.

The cartridge seated slide 44, shown in FIG. 1, is then engaged by the cartridge, and an optical sensor is tripped by movement of the slide 44. At this point, the loader motor 46, shown in FIG. 4, begins rotation of the cam plate 48, shown in FIG. 3. The cam position sensor 50, shown in FIG. 6, then changes state.

With the detent arms 30 engaged in the recesses 32 of the cartridge 12, as described above, the cartridge 12 is secured in the shuttle assembly 34, which is movable within the deck 54, shown in FIG. 5. A shuttle interlock feature 61, shown in FIGS. 1 and 5, is provided for selectively locking the shuttle 34 to the deck 54 for preventing damage to the read/write head 14 and tape if a robotic arm assembly were to inadvertently slam a cartridge into the shuttle 34. As the detent plates 56, shown in FIG. 1, begin to move, the shuttle interlock pin 58 is disengaged from the interlock notch 60, shown in FIG. 5, by means of an interlock cam 57 in the detent plate 56, driving the interlock actuator pin 59 which pivots the interlock arm 61 about the shuttle pin 63 for disengagement from the interlock notch 60.

Movement of the detent plate 56 permits the detent arm pin 62 to move within the slot 64, shown in FIG. 1, which actuates locking and unlocking of the detent arms 30 for loading and unloading the cartridge. As shown in FIG. 1, the detent arm pin 62 is locked within the slot 64 to lock the cartridge detent arms 30 to secure the cartridge (not shown) within the shuttle 34.

As shown in FIG. 1, the detent plates 56 are engaged with a center stable spring 66 for allowing the shuttle assembly 34 to move in and out with respect to the deck 54. A slot 64 in the cam plates 56 provide a locking and release function for the detent arms 30 via the detent arm pin 62. The detent plates 56 also provide a preloading function for holding the cartridge on the B1 and B2 datums, shown in FIGS. 5a and 5b.

The shuttle 34 then pulls the cartridge 12 approximately 1 inch into the deck 54. During this motion, the head cleaner mechanism 68, shown in FIG. 4, swipes across the read/write head 126. The head cleaner mechanism 68 includes a head cleaner linear slide 72 which is actuated by the rotary drum 74 with a helical path 76 therein. The rotary drum 74 is rotated by the motor 46. The head cleaner mechanism 68 moves the cleaning brush 70 across the read/write head 126 once during each load/unload sequence. During this 1 inch movement of the shuttle, the door opener 36, shown in FIG. 1, opens the cartridge door 20 via the cam slot 40, shown in FIG. 5, and cam pin 42, shown in FIG. 1.

During the one inch shuttle motion, the cartridge door opener 36, shown in FIG. 1, engages the cartridge 12 to begin opening the cartridge door 20, shown in FIG. 13. The cartridge door opener 36 is actuated laterally by the door opener cam 38, shown in FIG. 5, which includes a cam slot 40 for guiding the cam pin 42, shown in FIG. 1, which is connected to the door opener 36. When the door opener 36 is fully actuated at the end of the one inch motion, the cartridge door 20 is opened, and the tape within the cartridge 12 is exposed for read/write functions.

The cam position sensor 50, shown in FIG. 6, then changes state again, which triggers a sensor check to verify that the cartridge was not lost during the loading motion. After verification that the cartridge is present, the loader motion continues.

Next, the cartridge datum C1, shown in FIG. 13, which is the tertiary datum, engages an alignment slot C on the moving deck 54, shown in FIG. 5a.

The B1 and B2 datums of the cartridge 12, shown in FIG. 13, then contact the alignment features b1, b2 on the moving deck 54, shown in FIGS. 5a and 5b. The detent plates 56, shown in FIG. 1, move along with the cartridge 12, and the spring 66 corresponding with each detent plate 56 preloads the cartridge 12 against the datums b1, b2.

Figure 2:
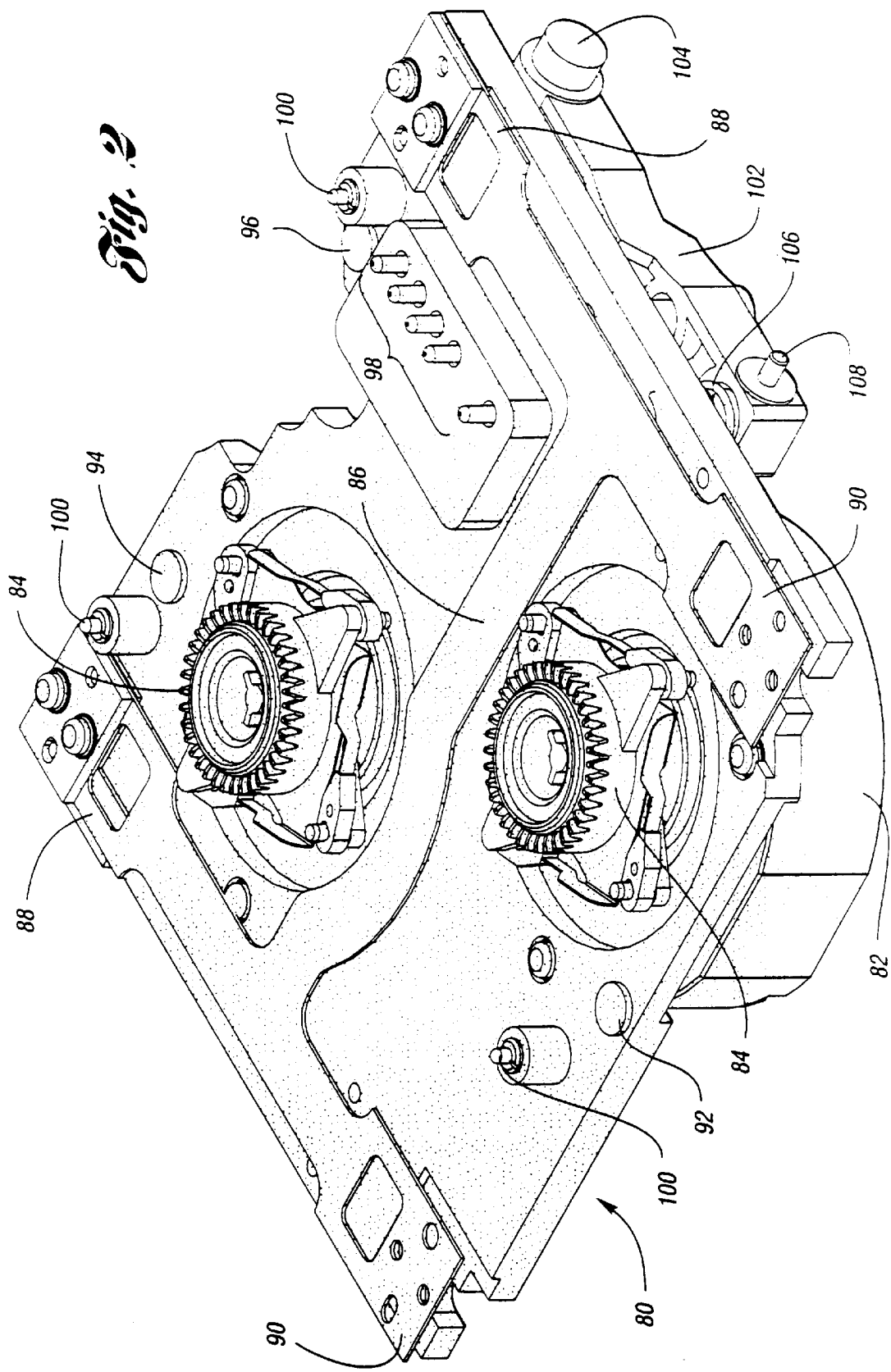
FIG. 2 shows a perspective view of a motor plate assembly in accordance with the present invention.

At this point, the motor plate assembly 80, shown in FIG. 2, is moved vertically toward the deck 54. The motor plate assembly 80 includes reel motors 82 for driving the couplings 84, which drive the tape reels 16, shown in FIG. 12. A substantially flat, generally H-shaped flexible flexure member 86, shown in FIG. 2, secures the motor plate assembly 80 to the deck 54. The first end 88 of the flexure member 86 is connected to the motor plate assembly 80, and the second end 90 is connected to the deck 54. This configuration allows relative vertical movement of the motor plate assembly 80 and deck 54 while aligning the reel motors to the tape reels 16 and preventing reel motor backlash. The flexure member 86 is preferably a thin stainless steel component to provide sufficient bending flexibility to allow vertical movement of the motor plate assembly 80 with respect to the deck 54, while preventing torsional flexion as the reel motors 82 rotate the couplings 84. As the motor plate assembly is lifted up toward the deck 54, the three datum pads 92, 94, 96 contact the deck 54 in order to control engagement of the couplings 84 with the tape reels 16. The datum pads 92, 94, 96 are shown in FIG. 2. Simultaneously, the cartridge identification sensors 98, shown in FIG. 2, engage the cartridge ID recesses 22, shown in FIG. 12, to verify the model of cartridge inserted.

As the couplings 84, shown in FIG. 2, engage the tape reels 16, shown in FIG. 12, spool locks are released. The cartridge 12 is lifted onto the a1, a2 and a3 datums of the moving deck 54, shown in FIGS. 5*a*, 5*b* and 7. The cartridge is preloaded against the a1, a2, and a3 datums by spring-loaded plungers 100, shown in FIG. 2, extending from the motor plate assembly 80.

As shown in FIG. 2, the motor plate assembly 80 includes a motor plate preload arm 102 pivotally connected to the motor plate assembly 80 at the pivot joint 104, and including a preload spring 106 for preloading the datums 92, 94, 96 against the deck, spring loading the plungers 100 against the cartridge 12 and reel motor couplings 84 against the cartridge reel 16. Pivotal movement of the motor plate preload arm 102 is provided by engagement of the pin 108 in the elevator cam path 110, shown in FIG. 3.

Accordingly, the motor plate assembly provides a platform for accurately mounting the motors 82, provides a location for the cartridge identification sensor 98, provides a preload to the cartridge shell via spring-loaded plungers 100, controls the engagement depth of the couplings 84 into the cartridge 12, and preloads the entire drive mechanism against the deck and the cartridge through the preload arm 102.

Again, the cam position sensor 50, shown in FIG. 6, changes state at the detented unwrapped position, and motion stops. The reel motors 82, shown in FIG. 2, take up slack between the tape spools 16 inside the cartridge 12, and locate the middle of the tape.

Upon command, the deck 54 moves forward approximately 0.16 inches to wrap the tape onto the read/write head assembly 14, as shown in FIG. 9. The moving deck 54 is mounted on four vertical flexures 112, shown in FIG. 4, which extend substantially perpendicular with respect to the base 114 of the housing 116. The flexures 112 have first and second ends 118,120, respectively, and are attached at the first end 118 to the base 114. The second end 120 of each flexure 112 is attached to the deck 54. The flexures 112 are sufficiently rigid in all the degrees of freedom (up-down, side-to-side) except for motion normal to their plane of attachment (which is a vertical plane as viewed in FIG. 4) to support and maintain alignment of the deck 54, and sufficiently flexible in the direction normal to their plane of attachment for allowing movement of the deck 54 with respect to the base 114 for moving the cartridge 12 toward and away from the read/write head 14. The flexures 112 are preferably thin, stainless steel components. This structure permits the deck 54 to move in and out without losing alignment to the read/write head 126.

The vertical flexures 112 are operative to provide a tape lifter function or tape wrap function which allows the tape 18, shown in FIG. 9, to be moved into contact with the read/write head assembly 14 for read/write operations and out of contact with the read/write head assembly 14 for high speed tape operations, such as fast-forward and rewind.

Figure 4:
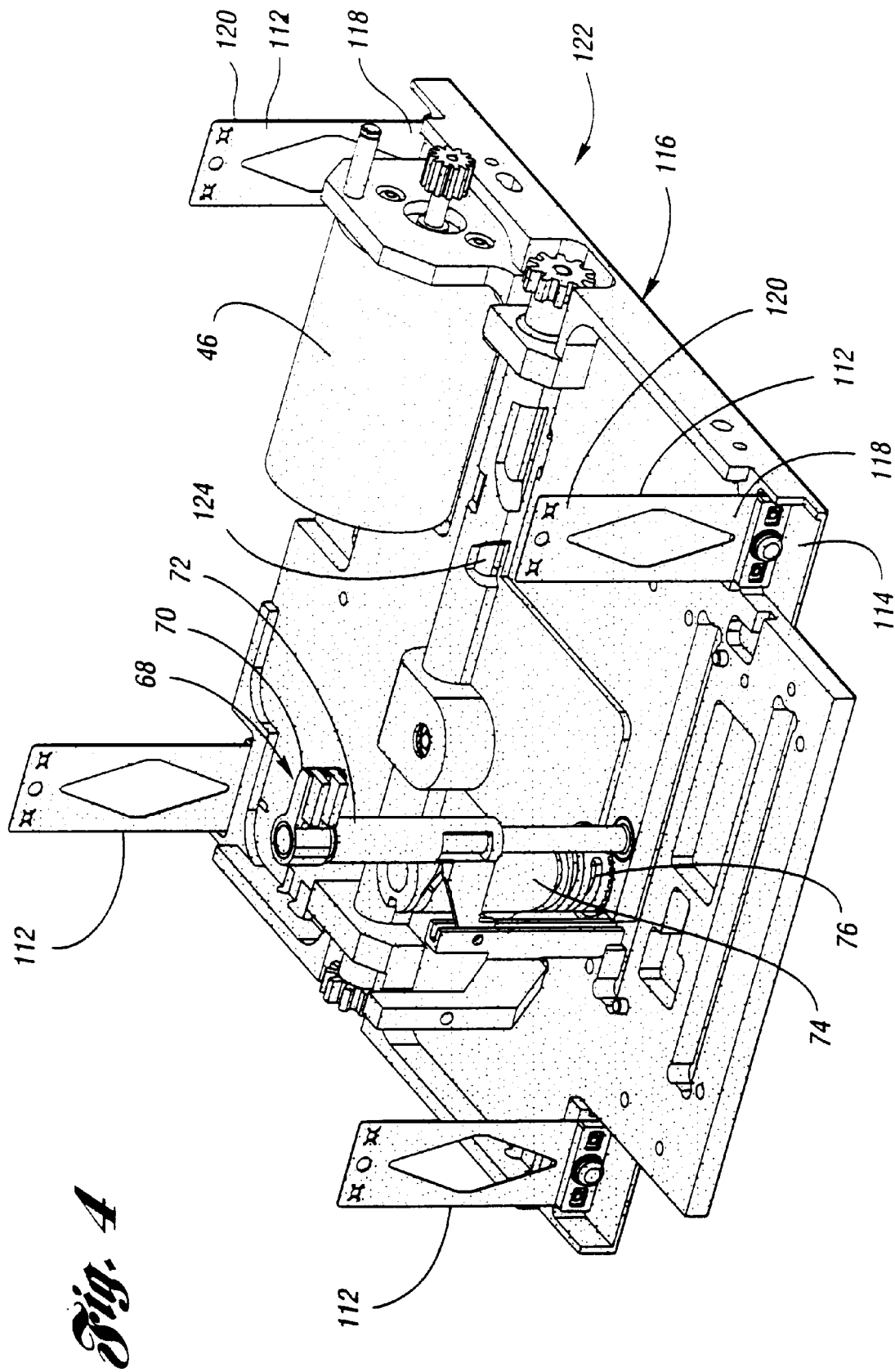
FIG. 4 shows a perspective view of vertical flexures secured to the housing base in accordance with the present invention.

The vertical flexures 112 are supported on the base plate assembly 122 (which includes the base 114), shown in FIG. 4. The base plate assembly 122 is considered to be part of the housing 116. The base plate assembly 122 contains the drive motor 46, the idler cross-shaft 124, and the head cleaner assembly 68.

As shown in FIGS. 8–10, the read/write head 126 is positioned at the rear of the cartridge loading device 10 so that the tape 18 may be exposed against the read/write head assembly 14 when the cartridge is advanced to the rear of the cartridge loading device 10. As viewed in FIG. 9, the head 126 is movable vertically on guide shafts 128, which ride on bearings 130. The head assembly 14 includes a position encoder 134, flex circuits 136, 138, 140, a coil actuator 142, and skew adjustment features 144,146.

As the deck 54 continues to move, it contacts a hard stop on the read/write head assembly 14, which sets the tape wrap angle and penetration. Again, the cam position sensor 50 of FIG. 6 changes state.

In this position, read/write functions can now be performed by the read/write head assembly 14 on the tape 18, and the moving deck 54 can be toggled back and forth between the wrap and unwrap position to provide a tape lifter function.

The cartridge unload process occurs in the reverse order of the above-defined process.

Figure 3:
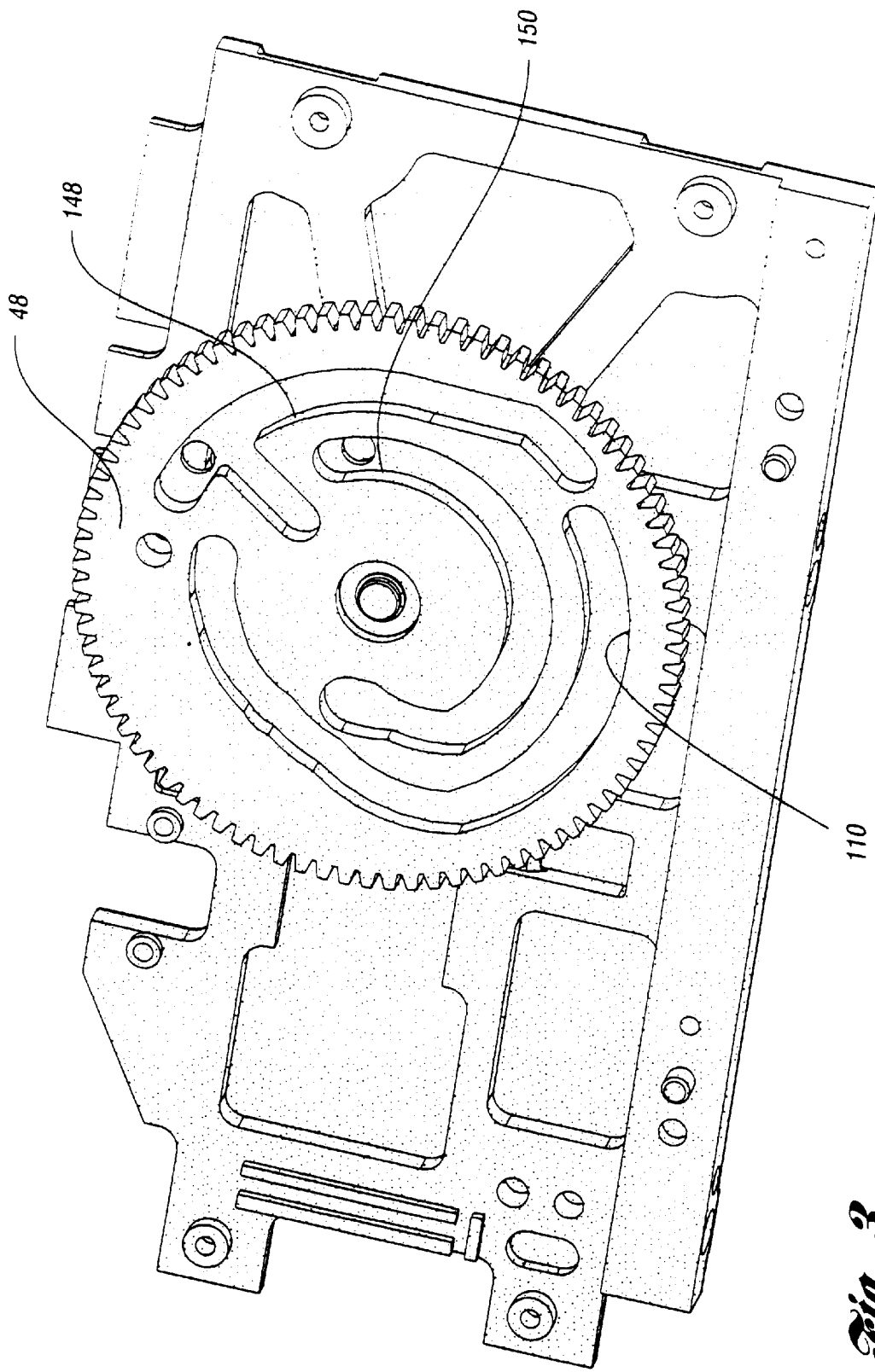
FIG. 3 shows a perspective view of a cam plate secured to a housing in accordance with the present invention.

Referring to FIGS. 3 and 11*a*–11*g*, the motions of the motor plate assembly 80, moving deck 54, and shuttle 34 are all defined by the cam paths 110, 150 and 148, respectively, formed in the cam plate 48, shown in FIG. 3. The elevator cam path 110 engages the motor plate pin 108 shown in FIG. 2, the shuttle cam path 148 engages the shuttle pin 152, shown in FIG. 1, and the deck cam path 150 engages the deck pin 154, shown in FIG. 5.

The sequence of movement of the respective pins within the three cam paths is illustrated sequentially in FIGS. 11*a*–11*g*. In FIG. 11*a*, each pin 108, 152, 154 is at the end of its respective cam path 110, 148, 150. In this position, the cartridge loading device 10 is in the open position and the detent arms 30 are unlocked for receiving the cartridge 12. After 20° of clockwise rotation to the position shown in FIG. 11*b*, the shuttle pin 152 engages the radial portion 156 of the shuttle cam path 148 to actuate movement of the shuttle 34. As shown in FIGS. 11*b*–11*d*, in this cam plate rotational range of 71.3°, the shuttle pin 152 is retained within the radial portion 156 of the shuttle cam path 148, which causes the 1 inch movement of the shuttle 34.

In the 60° of rotational movement between the positions of FIGS. 11*d* and 11*e*, the movement of the pin 108 within the elevator cam path 110 causes the motor plate assembly 80 to rise vertically for engagement with the deck 54.

The movement represented between FIGS. 11*e* and 11*f* of the pin 108 within the elevator cam path 110 compresses the motor plate preload arm spring 106 to load the motor plate assembly 80 against the datums 92, 94, 96.

The movement represented between FIGS. 11*f* and 11*g* is 40° of rotational movement. In this range, movement of the deck pin 154 within the deck cam path 150 causes tape lifter movement of the deck of approximately 0.160 inch to wrap the tape against the read/write head 14. The vertical flexures 112, shown in FIG. 4, flex to allow such movement.

All such movement is actuated by the single motor 46, shown in FIG. 4, which drives rotation of the cam plate 48, shown in FIG. 3.

The invention also provides a method of engaging a tape cartridge 12 with a read/write head 14 in a media system, comprising: a) receiving the tape cartridge 12 within a movable shuttle 34 which is locked in a position spaced from the read/write head assembly 14; b) unlocking the shuttle 34; c) moving the shuttle 34 toward the read/write head assembly 14 to position the tape cartridge 12 against the primary, secondary and tertiary datums in the deck; d) raising the motor plate to engage the reel motors with the cartridge reels; e) bringing the reel motion and tape tension under servo-control; and f) moving the deck with the shuttle and cartridge an additional distance to engage the tape 18 in the cartridge with the read/write head 126. The tape cartridge 12 includes a three-point primary datum A1, A2, A3; a two-point secondary datum B1, B2; and a one-point tertiary datum C1, and the method further comprises providing a spring preload against each such datum.

While the best mode for carrying out the invention has been described in detail, those familiar with the art to which this invention relates will recognize various alternative designs and embodiments for practicing the invention within the scope of the appended claims.

What is claimed is:

1. An apparatus for moving a tape cartridge with respect to a read/write head in a media system, wherein the tape cartridge includes a tape stored on tape reels, the apparatus comprising:

a housing;

a deck configured for holding a tape cartridge, said deck being movably positioned within the housing for movement in a horizontal direction with respect to the housing;

a movable shuttle positioned within the deck for moving the tape cartridge in a horizontal direction with respect to the deck; and a shuttle interlock mechanism positioned between the deck and the shuttle for selectively locking the shuttle with respect to the deck in a position in which the cartridge is not engaged with the read/write head to prevent damage to the read/write head wherein the deck, movable shuttle and read/write head are positioned along a common plane defined by a direction of insertion of the cartridge into the deck and by said horizontal directions of movement of the deck and shuttle.

2. The apparatus of claim 1, wherein said shuttle interlock mechanism comprises a detent arm pivotally connected to the shuttle and having a detent pin extending therefrom, and a detent plate slidably mounted to the shuttle, said detent plate having a detent cam path therein for guiding said detent pin into locking engagements with a notch formed in the deck, thereby preventing shuttle movement with respect to the deck.

3. The apparatus of claim 2, further comprising a center-stable spring biasing the detent plate with respect to the shuttle for preloading the cartridge.

4. The apparatus of claim 3, wherein said detent arm is engageable with a detent catch formed in the cartridge for grasping the cartridge.

5. The apparatus of claim 1, wherein the cartridge includes a cartridge door, and said shuttle includes a door opener actuated by a cam member extending from the deck.

6. The apparatus of claim 1, further comprising a vertically movable motor plate positioned adjacent the deck and having first and second reel motors mounted to the motor plate for driving the tape reels.

7. The apparatus of claim 6, further comprising a preload arm pivotally connected to the motor plate and having a spring for providing a spring preload against the tape reels when the preload arm is pivoted toward the tape cartridge.

8. The apparatus of claim 6, further comprising a substantially flat, substantially H-shaped flexure member connected at opposing ends to said deck and motor plate, respectively, to prevent reel motor backlash and align the reel motors to the tape reels.

9. The apparatus of claim 1, wherein the tape cartridge includes primary, secondary and tertiary locating features, and the apparatus includes a plurality of springs for providing a spring load against said locating features.

10. The apparatus of claim 1, further comprising a head cleaner brush actuated by a rotary drum with a helical cam therein.

11. A method of engaging a tape cartridge with a read/write head in a media system, the method comprising:

receiving the tape cartridge within a horizontally movable shuttle which is locked in a position spaced from the read/write head in a horizontally movable deck;

unlocking a shuttle interlock mechanism positioned between the deck and the shuttle for enabling movement of the shuttle; and moving the shuttle horizontally toward the read/write head to engage the tape cartridge with the read/write head, wherein the deck, movable shuttle and read/write head are positioned along a common plane defined by a direction of insertion of the cartridge into the deck and by said horizontal directions of movement of the deck and shuttle.

12. The method of claim 11, wherein the tape cartridge includes a three-point primary datum, a two-point secondary datum, and a one-point tertiary datum, and the method further comprises providing a spring preload against each said datum.

13. An apparatus for moving a tape cartridge with respect to a read/write head in a media system, wherein the tape cartridge includes a tape stored on tape reels, the apparatus comprising:

a housing;

a deck configured for holding a tape cartridge, said deck being movably positioned within the housing for movement in a horizontal direction with respect to the housing;

a movable shuttle positioned within the deck for moving the tape cartridge in a horizontal direction with respect to the deck;

a shuttle interlock mechanism positioned between the deck and the shuttle for selectively locking the shuttle with respect to the deck to prevent damage to the read/write head; and wherein said shuttle interlock mechanism comprises a detent arm pivotally connected to the shuttle and having a detent pin extending therefrom, and a detent plate slidably mounted to the shuttle, said detent plate having a detent cam path therein for guiding said detent pin into locking engagement with a notch formed in the deck, thereby preventing shuttle movement with respect to the deck.

* * * * *